United States Patent [19]

Lill

[11] 4,375,130
[45] Mar. 1, 1983

[54] METHOD FOR ADJUSTING THE TOE OF THE STEERABLE WHEELS ON A VEHICLE RELATIVE TO THE AVERAGE ROLLING DIRECTION OF THE VEHICLE NONSTEERABLE WHEELS

[75] Inventor: Melvin H. Lill, San Jose, Calif.
[73] Assignee: FMC Corporation, Chicago, Ill.
[21] Appl. No.: 261,440
[22] Filed: May 8, 1981
[51] Int. Cl.³ .......................................... G01B 11/275
[52] U.S. Cl. .................................................. 33/228
[58] Field of Search .......... 33/228, 288, 286, 180 AT, 33/181 AT, 276, 277, 203, 203.15, 203.16

[56] References Cited

U.S. PATENT DOCUMENTS

| | | | |
|---|---|---|---|
| 2,972,189 | 2/1961 | Holub | 33/288 |
| 3,091,862 | 6/1963 | MacMillan | 33/288 |
| 3,337,961 | 8/1967 | Holub | 33/288 |
| 3,855,709 | 12/1974 | Hirmann | 33/288 |
| 4,058,903 | 11/1977 | Wilkerson | 33/288 |
| 4,097,157 | 6/1978 | Lill | 33/288 |
| 4,106,208 | 8/1978 | Hunter | 33/288 |
| 4,130,362 | 12/1978 | Lill et al. | 33/288 |
| 4,302,104 | 11/1981 | Hunter | 33/288 |
| 4,311,386 | 1/1982 | Coetsier | 33/288 |
| 4,319,838 | 3/1982 | Grossman et al. | 33/288 |
| 4,341,021 | 7/1982 | Beissbarth | 33/288 |
| 4,344,234 | 8/1982 | Lill et al. | 33/288 |

*Primary Examiner*—Willis Little
*Attorney, Agent, or Firm*—H. M. Stanley; R. B. Megley

[57] ABSTRACT

A method is disclosed by which, through the use of known wheel alignment equipment including wheel mounted alignment heads and targets, the off-track condition between the rear and front wheel pairs of a vehicle and the rear wheel total toe is initially measured to determine if it is within specifications for the specific vehicle. Following adjustment of the rear wheels, if necessary, to place these characteristics within the specifications, the wheel alignment equipment on each side of the vehicle is adjusted to assume an orientation dictated by the remaining off-track condition and the rear wheel average rolling direction. The alignment equipment is then fixed in such orientations. The wheel mounted alignment heads and targets are thereafter transferred, with adjustments intact, to diagonally opposite wheels. The front wheels are then moved through a steering excursion sufficient to provide an indication on the targets that the total front wheel toe is split about the rear wheel average toe direction. Thereafter adjustment to the front wheel steering linkage may be made to center the steering control and to obtain desired total front toe.

20 Claims, 6 Drawing Figures

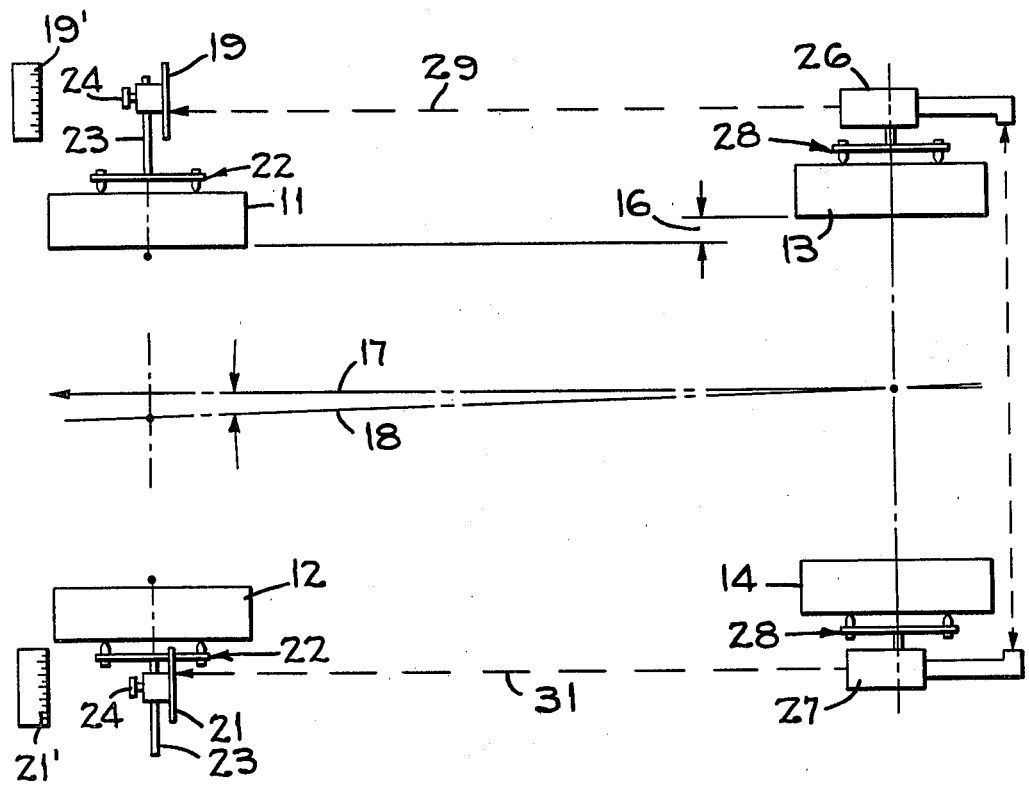
FIG_1
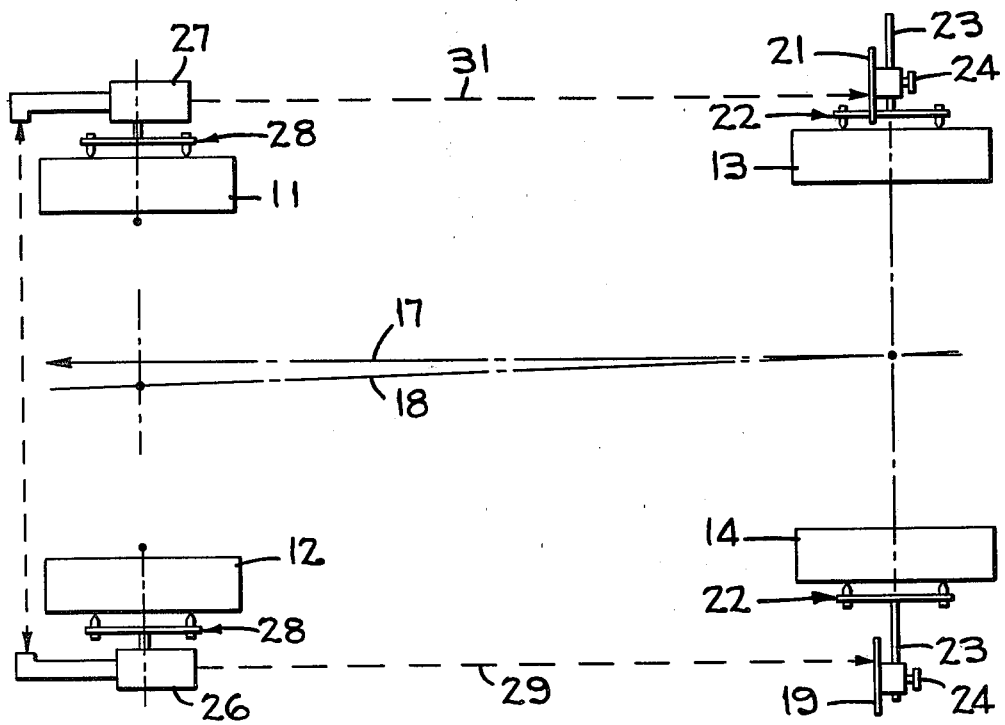
FIG_2

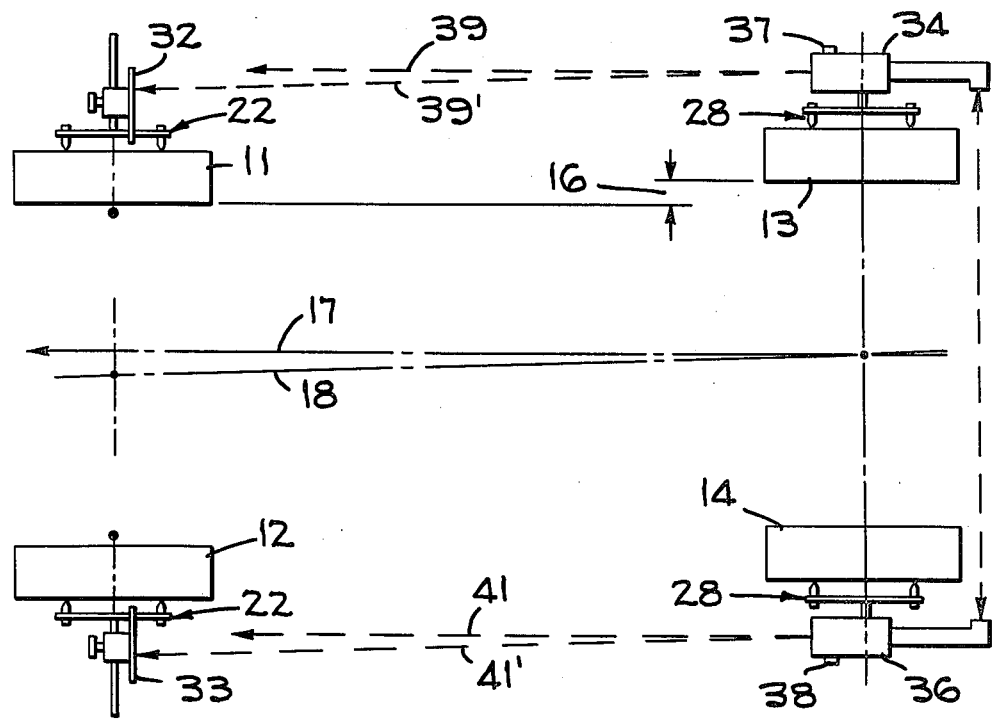
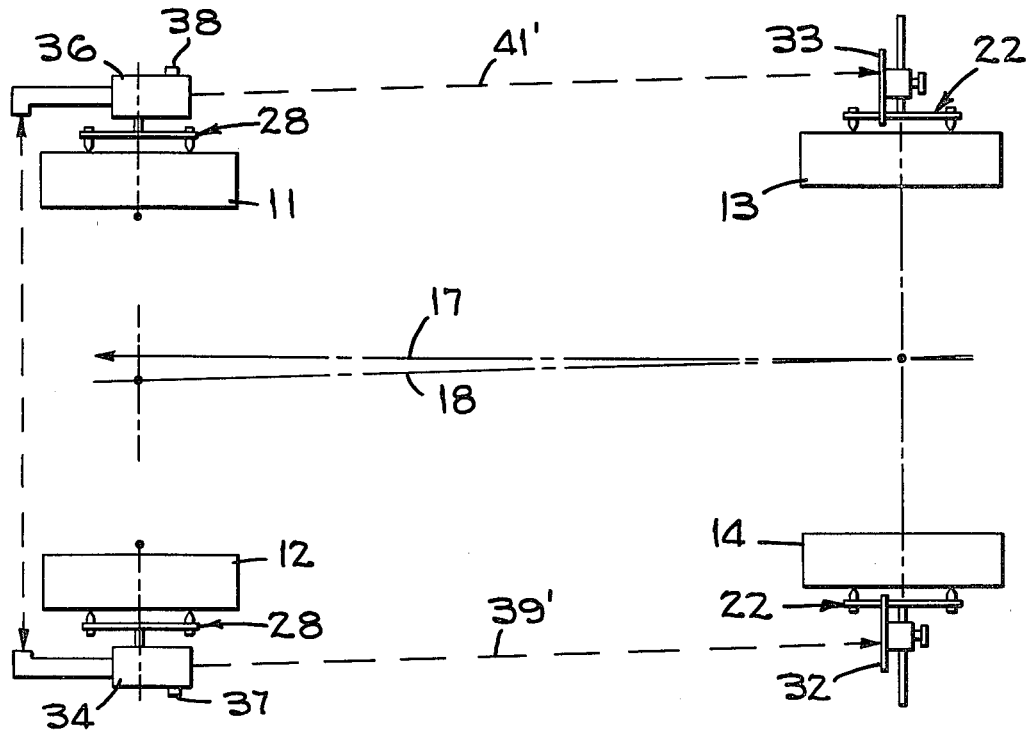

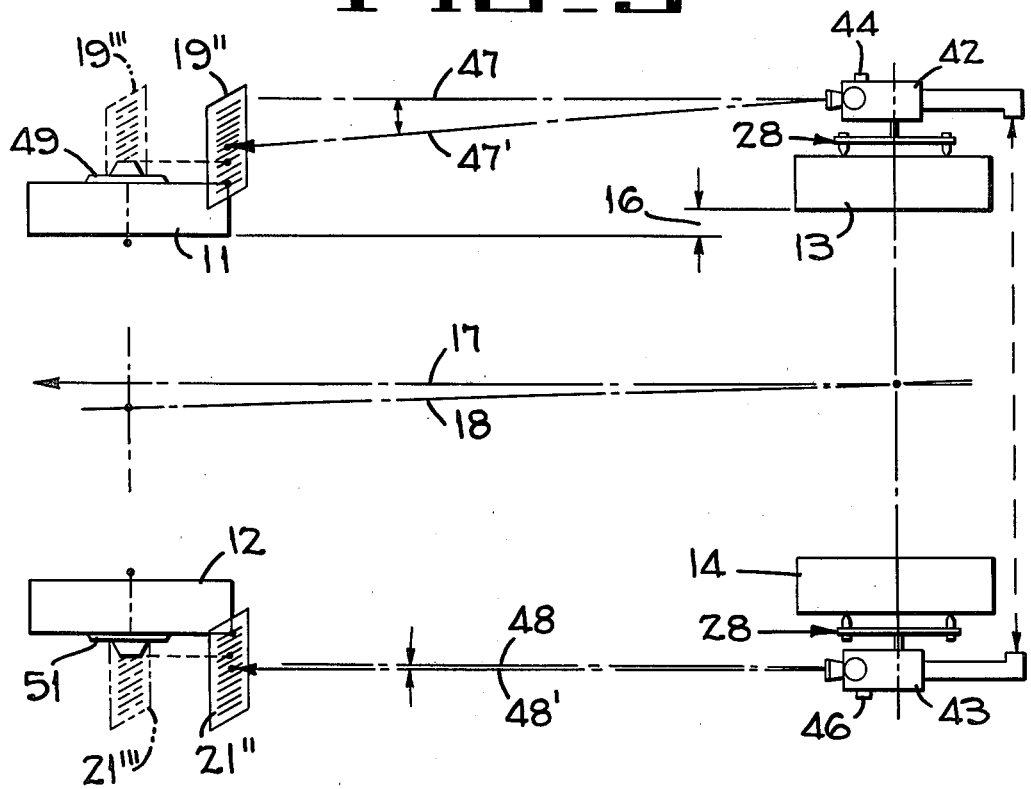
FIG_5
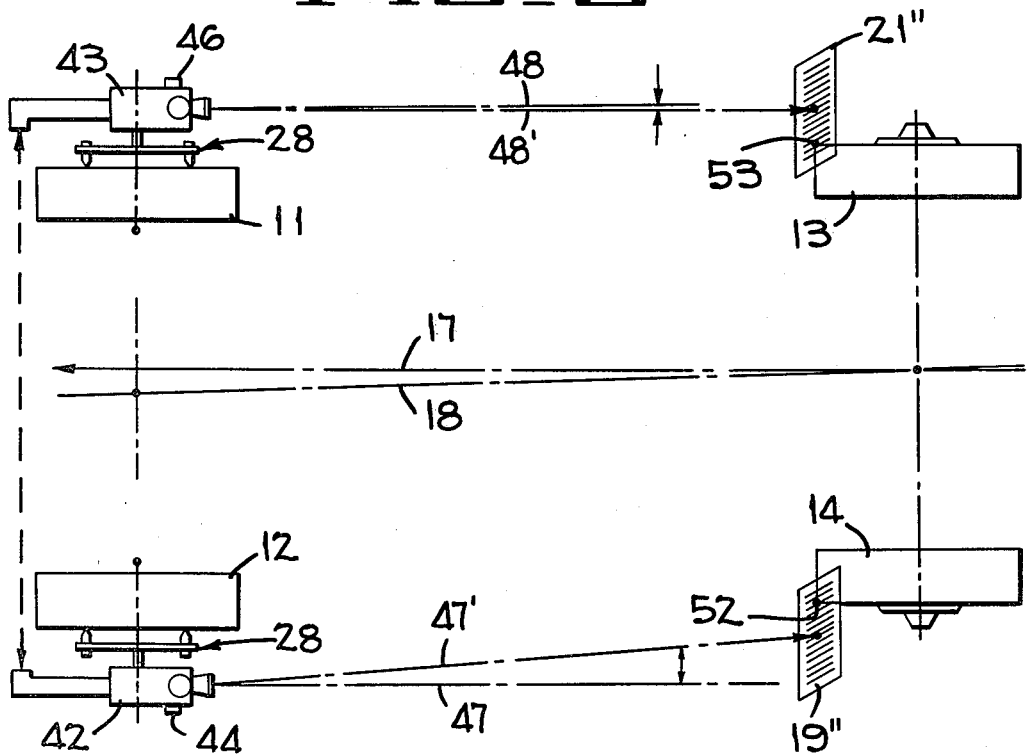
FIG_6

METHOD FOR ADJUSTING THE TOE OF THE STEERABLE WHEELS ON A VEHICLE RELATIVE TO THE AVERAGE ROLLING DIRECTION OF THE VEHICLE NONSTEERABLE WHEELS

BACKGROUND OF THE INVENTION

1. Field of the Invention

This invention relates to a method for obtaining wheel alignment in a vehicle having steerable front wheels and nonsteerable rear wheels and more particularly to such a method wherein the reference for the steerable wheel alignment is provided by the orientation of the nonsteerable wheels.

2. Description of the Prior Art

One manner in which the toe of the front steerable wheels on a vehicle is measured is disclosed in U.S. Pat. No. 4,097,157, Lill, issued June 27, 1978. The individual toe of one of the front wheels is measured with respect to the axis of rotation of the rear wheel on the same side of the vehicle. The total toe is then measured between the two front steerable wheels. By subtracting the toe of the front wheel measured with respect to the axis of the rear wheel from the total front wheel toe, the individual toe of the second of the two front steerable wheels is found.

An apparatus is disclosed in U.S. Pat. No. 3,091,862, MacMillan, issued June 4, 1963, in which a pair of right and left hand targets are positioned in known relationship with the rear wheels on a vehicle. Sighting tubes are provided which are aligned with the planes parallel to the steerable front wheel planes and which are directed rearwardly toward the targets on each side of the vehicle. The steering angle of the front wheels is adjusted until similar points on the rear positioned targets are observed through the sight tubes. The wheels are now steered straight ahead relative to the rear wheels and the steering wheel inside the car may be adjusted to a centered position by well known mechanical adjustments.

U.S. Pat. No. 2,972,189, Holub, issued Feb. 21, 1961 relates to apparatus for checking wheel alignment of automobiles which includes telescopes mounted on each of the front steerable wheels together with a third telescope mounted midway bwtween the two front wheels. The third telescope is utilized to sight along predetermined center points on the frame of the vehicle. The function of the third telescope is to check the alignment of the frame as well as the relation of the frame with the front end and rear housing. The telescopes mounted on the steerable wheels may be trained at specified points on the rear wheels. If scales associated with the direction of train of the telescopes in a horizontal plane read substantially the same, the tracking of the front wheels with the rear wheels is presumably satisfactory. The centrally mounted telescope is used to verify vehicle frame alignment.

U.S. Pat. No. 3,855,709, Hirmann, issued Dec. 24, 1974 discloses a system which includes an electromechanical computer which ascertains the centerline of a vehicle and makes wheel alignment measurements relative to the centerline. The apparatus disclosed by Hirmann is fixed in position surrounding a space into which a vehicle is driven. The alignment characteristics of the vehicle wheels are thereafter measured by the apparatus fixed in position and surrounding the vehicle.

An optical system is disclosed in U.S. Pat. No. 4,058,903, Wilkerson, issued Nov. 22, 1977, in which sighting tubes and scales are provided at both the front and the rear of the vehicle. The sighting tubes and scales are mounted on structure which is positioned adjacent to the vehicle. The scales are sighted through the tubes so that information relating to the angular orientation of each wheel pair axis relative to a vehicle steering axis is obtained. The stated purpose of the apparatus is to ascertain certain faults in the alignment of the vehicle frame and not to align the wheels of the vehicle.

SUMMARY OF THE INVENTION

The process disclosed herein is utilized with an alignment system which includes wheel mounted toe measurement instruments together with wheel mounted graduated scales operating to indicate lateral positions relative to the wheels on which they are mounted. Alignment optics are provided in the toe measuring instruments which are in optical communication with the wheel mounted scales. Initially the toe measuring instruments are mounted on a pair of nonsteerable wheels and the graduated scales are mounted on a pair of steerable wheels supporting the vehicle. The orientation between the alignment optics and the graduated scales is adjusted on each side of the vehicle so that the optics indicate similar positions on each of the scales. The toe measuring instruments and the graduated scales are transferred to diagonally opposite wheels while maintaining the previous orientation adjustment between the toe measuring instruments and the scales. The steerable wheels are turned until the orientation between the scales and the alignment optics again indicates similar positions on the scales. When such a steerable wheel pair position is obtained the total front wheel toe is split about the average rear wheel rolling direction.

BRIEF DESCRIPTION OF THE DRAWINGS

FIG. 1 is a plan view of a four wheeled vehicle illustrating the method of the present invention using one type of wheel alignment apparatus.

FIG. 2 corresponds to FIG. 1 showing the apparatus rearranged to perform further steps in the method of the present invention.

FIG. 3 is a plan view of a four wheeled vehicle illustrating the method of the present invention using another type of wheel alignment apparatus.

FIG. 4 corresponds to FIG. 3 showing the apparatus rearranged to perform further steps in the method of the present invention.

FIG. 5 is a plan view of a four wheeled vehicle illustrating the method of the present invention using yet another type of wheel alignment apparatus.

FIG. 6 corresponds to FIG. 5 showing the apparatus rearranged to perform further steps in the method of the present invention.

DESCRIPTION OF THE PREFERRED EMBODIMENTS

Referring to FIG. 1 a plan view of the relative wheel positions in a four wheeled vehicle is shown wherein a pair of front steerable wheels 11 and 12 are coupled to a pair of rear nonsteerable wheels 13 and 14 through a framework (not shown). The front and rear wheel pairs are shown in these diagrams as having similar tread widths. The method to be hereinafter described may be used as readily where the wheel tread widths are different on the front and the back of the vehicle. An off track condition wherein the front wheel pair is off-set transversely to the vehicle frame relative to the rear wheel pair is shown in FIG. 1 represented by the item number 16. The rear wheels 13 and 14 will have some total toe angle therebetween, the bisector of which will extend in the average rear rolling direction 17 for the rear wheels. (This rolling direction 17 has been variously defined in this field as "average rear toe direction", "straight ahead direction" and "thrust line".) If the off track condition is within acceptable limits for the vehicle and if the total rear wheel toe is within specifications, it is desirable to set the front wheel centered steering direction so that it is in the same direction as the average rolling direction of the rear wheels. The rear rolling direction 17 in FIG. 1 may be seen to depart from a framework centerline 18 which is defined as a line through the center points between the front and rear wheel pairs. Some angular departure between the rear rolling direction 17 and the centerline 18 is generally present in most vehicles due to tolerance build up and is allowable up to some accepted maximum departure for any particular vehicle.

FIG. 1 shows a pair of targets 19 and 21 using conventional mounting structure 22 which places each target face in a vertical plane substantially perpendicular to the plane of the wheel upon which each is mounted. The faces of the targets 19 and 21 have graduated scales thereon as illustrated in the view of the target faces 19' and 21' adjacent to the front wheels 11 and 12 in FIG. 1. The targets are mounted on horizontal shafts 23 extending from the mounting hardware 22 in a direction which is orthogonal to the planes of the wheels on which mounted. The targets are movable along the shafts 23 and may be locked in position therealong at any desired lateral position by means of a locking screw 24 which may be brought to bear against the shaft 23 to thereby hold the target 19 in position laterally relative to the wheel.

A pair of aligner heads or toe measuring instruments 26 and 27 are mounted by conventional hardware 28 to the rear wheels 13 and 14 respectively. The alignment heads may be any of the types disclosed in U.S. Pat. No. 4,154,531, Roberts, Jr. et al, issued May 15, 1979; U.S. Pat. No. 4,180,326, Chang, issued Dec. 25, 1979; or U.S. Pat. No. 4,097,157, Lill, issued June 27, 1978. The foregoing described toe measuring instruments as used in practicing the method disclosed herein will include the "rearward looking" alignment optics as disclosed in copending patent application Ser. No. 261,445 or copending patent application Ser. No. 261,441, both of which applications are filed on even date herewith. The alignment heads 26 and 27 therefore have the capability of projecting "rearwardly" (relative to the heads themselves) energy beams 29 and 31 respectively, or of providing a view along "rearwardly" extending optical paths, each of which lie along the path of one of the beams 29 and 31. The mounting 28 for each of the alignment heads 26 and 27 is such that when the heads are properly mounted for measuring toe between any pair of wheels (rear wheels in FIG. 1 and front wheels in FIG. 2), the beams or optical paths extend in directions substantially parallel to the planes of the wheels upon which they are mounted.

As shown in FIG. 1 the targets 19 and 21 are mounted on the front wheel pair 11 and 12 respectively and the alignment heads 26 and 27 with the "rearwardly" facing alignment optics are mounted on the pair of rear wheels 13 and 14 respectively. The targets 19 and 21 are initially positioned at a "home" position equidistant laterally from the front wheels 11 and 12 and the point of impingement of the optical paths 29 and 31 on the targets 19 and 21 is noted. These points may not differ by more than a specified distance for a particular vehicle frame for the off-track characteristic of the vehicle to be acceptable. Moreover, the total toe between the rear wheels 13 and 14 is measured and indicated by the alignment heads 26 and 27 and must also be within a specified range for the particular vehicle. Initially the off-track and rear wheel total toe are noted from the structural arrangement shown in FIG. 1 and any corrections to off-track and rear wheel total toe are made utilizing well known steps so that the offtrack and total rear wheel toe for the vehicle for which alignment is being undertaken are brought within acceptable limits with the least amount of time expended. Thereafter the locks 24 are loosened and the targets 19 and 21 are adjusted laterally so that the beams 29 and 31 (or a line of sight along each beam path) impinge on the targets at similar points on the graduated scales on the target faces 19' and 21'. For example, the target 19 may be moved outwardly until the beam 29 impinges on the numeral two on the scale thereon and the target 21 is also moved laterally until the beam 31 impinges on the numeral two on that scale. Each scale is the mirror image of the scale on the opposite side of the vehicle. Once so positioned, the scales are locked in place on the horizontal shafts 23 by setting the locks 24.

The alignment heads 26 and 27 are then detached from the rear wheels 13 and 14 respectively and mounted at diagonally opposite positions on the vehicle on the wheels 12 and 11 respectively of the front wheel pair as seen in FIG. 2. The targets 19 and 21 with the adjustments intact as made in the set up of FIG. 1, are detached from their respective front wheels and moved to the diagonally opposite rear wheels. Therefore target 19 in its adjusted lateral position is mounted on rear wheel 14 and target 21 in its adjusted position is mounted on rear wheel 13. The front wheels 11 and 12 are then steered to a position such that the projected beams along paths 29 and 31 fall upon similar scale graduations on the targets 19 and 21. For example, the steering wheel may be turned until the optical paths 29 and 31 both impinge on the scales at a position reading "1¾". For scale markings increasing as the scale extends outwardly from the wheel, the similar markings will be smaller for smaller front wheel tread widths when the scales are mounted on the rear wheels and larger for larger front wheel tread widths. The important matter is that the points of impingement on the rear mounted targets be similar on each side of the vehicle regardless of the value of the scale points at which impingement occurs.

It may be seen that the steps undertaken as illustrated in FIG. 1 provide two directions along the paths 29 and 31 which form an angle, the bisector of which is the average rolling direction 17 of the vehicle rear wheels. When the targets and the alignment heads are transferred to the diagonally opposite rear wheels and the steerable front wheels are adjusted in steering so that the optical paths pass through points on the targets which are again similar on the two scales, the optical paths 29 and 31 once again form an angle, the bisector of which is parallel to the rolling direction of the rear wheels. The front wheels are now steering in a direction parallel to the rear wheel rolling direction 17 of the rear wheels 13 and 14. The total toe of the front steerable wheels is now split about the rear wheel rolling direction 17. The total toe between the front wheels 11 and 12 is measured by the alignment heads 26 and 27. If the steering wheel is not centered, one of the tie rods may be adjusted which will tend to bring the steering wheel toward the center position and which will also obtain the desired total front toe. After the desired total front toe is obtained the steering wheel must be turned so that optical paths 29 and 31 again impinge on similar points on the graduated scales 19 and 21. If the steering wheel is not yet centered then both tie rods may be adjusted in opposite ways to maintain the same total toe but to move the steering wheel toward the centered position. It follows that after an adjustment of toe for either or both front wheels the steering wheel may be moved so that optical paths 29 and 31 again impinge on similar points on the graduated scales of targets 19 and 21 mounted on the rear wheels 14 and 13 in order to prove whether the steering wheel is satisfactorily centered. Alternatively, the steering wheel may be clamped in a centered position and one or both tie rods adjusted to bring the total front toe within specifications and the readings on targets 19 and 21 practically equal.

It should be noted that the method described in conjunction with FIGS. 1 and 2 could be carried out if the targets 19 and 21 were not movable laterally and the alignment heads 26 and 27 where movable laterally. In such a case, after obtaining the alignment between the targets and the optical paths 29 and 31 hereinbefore described, the alignment heads would be locked in position laterally and the method would proceed as before.

With reference now to FIG. 3, the same set of steerable front wheels 11 and 12 and nonsteerable rear wheels 13 and 14 is shown having a similar off track characteristic 16 and a rear rolling direction 17 displaced from the centerline of the chassis (as defined hereinbefore) such as shown in FIGS. 1 and 2. A pair of targets 32 and 33 having faces with graduated scales thereon (similar to targets 19 and 21 and faces 19' and 21') are mounted on the steerable front wheels 11 and 12 respectively. The targets 32 and 33 are mounted with their faces in substantially vertical planes perpendicular to the planes of the wheels 11 and 12 by means of the conventional mounting structure 22. However, the targets 32 and 33 are not movable laterally relative to the wheels, but are fixed in lateral position relative thereto.

A pair of alignment heads or toe measuring instruments 34 and 36 are mounted on the rear wheels 13 and 14 respectively by means of the conventional mounting structure 28. The alignment heads may be similar to those disclosed in the patents mentioned hereinbefore in relation to the alignment heads 26 and 27. The alignment heads 34 and 36 are modified to incorporate the "rearwardly projected" optical paths described in the aforementioned copending patent applications filed on even date herewith. Adjustment controls 37 and 38 are provided on the alignment heads 34 and 36 by means of which the direction of extension of optical paths 39 and 41 may be angularly adjusted in the horizontal plane. A reference extension direction for the optical paths 39 and 41 extends in a direction parallel to the planes of the wheels 13 and 14 respectively. The off-track characteristic and total rear toe characteristic may be preliminarily checked for a specific vehicle undergoing alignment as hereinbefore described in connection with FIG. 1 while optical paths 39 and 41 are set in their reference extension directions.

With the targets 32 and 33 and the alignment heads 34 and 36 mounted as shown in FIG. 3, the impingement of a projected beam or the intersection of an optical view path along the directions 39 and 41 on the targets 32 and 33 is noted. If the points of impingement or intersection do not occur at similar scale graduations on the targets, the controls 37 and 38 are manipulated until such similar points of impingement or interception are obtained. The optical paths 39' and 41' indicate such optical paths after adjustment to obtain the similar points of impingement or interception. The controls 37 and 38 are thereafter locked in position to maintain the projection directions of paths 39' and 41' relative to the alignment heads 34 and 36 respectively.

The alignment heads 34 and 36 and the targets 32 and 33 are removed from their respective wheels and remounted on diagonally opposite wheels of the vehicle to thereby provide the arrangement as seen in FIG. 4. The front steerable wheels 11 and 12 are then steered to a position such that the optical paths 39' and 41' (maintained with the adjustment made as described in conjunction with FIG. 3) impinge or intercept the targets 33 at similar points at the graduated scales thereon. The initial adjustment of the optical paths 39 and 41 to assume the directions of paths 39' and 41', made in conjunction with the steps described relative to FIG. 3, provided a situation wherein the points of impingement of the paths on the targets 32 and 33 in FIG. 3 are equidistant from the center point between the front steerable wheels 11 and 12. When the front wheels 11 and 12 are steered to cause the optical paths 30' and 41' to again hit similar points on the scale graduations on the targets 32 and 33, the points of impingement now become equidistant from the center point between the nonsteerable rear wheels 13 and 14. The steerable front wheels 11 and 12 however are now aligned with the average rolling direction 17 of the rear wheels 13 and 14. This may be seen to be the case because the optical paths 39' and 41' originally were set up to intercept points equidistant from the front wheel pair center point and thus constructed an angle of which the bisector was the centerline 18 of the frame. Now the optical paths have been set by steering the front wheels to construct an angle of which the bisector is the centerline 18 of the frame rotated 180°. Thus, the front steerable wheels are aligned so that the total front wheel toe is split about the average rolling direction 17 of the rear wheels and the vehicle wheels are positioned to maintain the vehicle in a straight ahead direction. In the manner mentioned hereinbefore in conjunction with the embodiment of FIGS. 1 and 2, the total front toe may be read from the information provided by the alignment heads 34 and 36 and adjusted to the total front toe desired while also centering the steering wheel to the straight ahead steering position.

It should be noted that in the embodiment of FIGS. 3 and 4 that the optical paths 39' and 41' may be traversed by projected beams of visible light or may be merely paths along which an optical view is taken. In the latter instance, a cross hair or some other type of reticle mark may be used to define the center of the optical field of view. In either event, the direction of the light beam projection or the center of the optical viewing path is adjusted by the controls 37 and 38 respectively and that adjustment is fixed prior to the aforementioned transfer of the alignment heads 34 and 36 and the targets 32 and 33 to diagonally opposite wheels.

In summary, the method disclosed herein utilizes wheel mounted alignment heads providing toe readings for front and rear wheel pairs on a vehicle. The alignment heads have alignment optics therein. The method also utilizes wheel mounted graduated scales in optical communication with the alignment optics on each side of the vehicle. The method includes the steps of mounting the alignment heads on the rear wheels and the graduated scales on the steerable front wheels of the vehicle. Thereafter the orientation between the alignment optics and the graduated scales is adjusted on each side of the vehicle so that the optics indicate like positions on the scales. The alignment heads and the graduated scales are transferred to diagonally opposite wheels while maintaining the adjustments.

The steerable front wheels are turned in steering direction until the orientation between the graduated scales and the alignment optics again indicates like positions on the scales. The total front wheel toe is now split about the average rear wheel rolling direction.

FIGS. 5 and 6 depict an embodiment of the present invention which does not require the use of targets such as 19/21 (FIGS. 1 and 2) or 32/33 (FIGS. 3 and 4). As in the description of the embodiment of FIGS. 3 and 4 alignment heads are used which are modified to incorporate the "rearwardly projected" optical paths and are noted by item numbers 42 and 43 in FIGS. 5 and 6. Adjustment controls 44 and 46 are provided so that the direction of extension of a centerline along optical paths 47 and 48 respectively may be angularly adjusted relative to a reference direction.

In FIG. 5 the reference direction (parallel to the plane of the wheel on which the head is mounted) is shown at 47 and 48 for the heads 42 and 43 mounted on the rear wheels 13 and 14 respectively. An image containing graduation lines is formed by a reticle arrangement in the optics of each alignment head or a projection of such an image is formed which is represented by the item numbers 19" and 21" appearing at the front steerable wheels 11 and 12 in FIG. 5. The centerline of the image 19" is seen at 47' and the centerline of the image 21" is seen at 48'. With the front wheels in a position of symmetry, the centerline of each image may be adjusted angularly by the controls 44 and 46 so that similar points on each image will be superimposed on a point on each tire profile as shown, where the points are equidistant from the chassis centerline 18. Alternatively the centerlines of the images may be adjusted angularly until similar points on front wheel hubcaps 49 and 51 are viewed at similar points on the graduated images (FIGS. 5, 19''' and 21'''). In the latter case the same degree of front wheel steering symmetry is unnecessary. In either event, after angular adjustment, the controls 44 and 46 are locked so that further angular adjustment of the image centerlines is prevented.

The heads are removed from the rear wheels and mounted on the diagonally opposite front wheels as seen in FIG. 6. Head 42 is now on front wheel 12 and head 43 is now on front wheel 11. The front wheels are steered to position the images 19" and 21" so that a similar point at each image is superimposed on a point at the rear of the vehicle where the latter points are equidistant from the chassis centerline. Such points are shown on the rear wheel tire outlines at 52 and 53 in FIG. 6. As a consequence, the method described in conjunction with FIGS. 3 and 4 is carried out without need for the targets 32 and 33. It should be noted that if the controls 44 and 46 are not available (so that the centerlines of the image fields or projections are fixed in the directions 47 and 48) and if the alignment heads 42 and 43 are adjustable laterally along the axis of the wheel pairs, the same process may be carried out by locking the heads on their mounts at the lateral positions where the images appear as in FIG. 5. Subsequent repositioning of the heads diagonally and front wheel steering adjustment as hereinbefore described will provide the same results as obtained through the method described in conjunction with FIGS. 3 and 4.

When the method described with reference to FIGS. 5 and 6 is used with lateral adjustment of alignment heads 42 and 43, to assure accuracy the images should be superimposed on points symmetrical about the chassis centerline 18 and lying approximately on extensions of the axle of the opposing wheel pair.

Although the best mode contemplated for carrying out the present invention has been herein shown and described, it will be apparent that modification and variation may be made without departing from what is regarded to be the subject matter of the invention.

What is claimed is:

1. A method for use with an alignment system including toe measurement instruments mounted on a vehicle having steerable and non-steerable vehicle wheel pairs for setting the toe of the steerable wheel pair relative to the average rolling direction of the non-steerable wheel pair, comprising the steps of mounting the toe measuring instruments on the non-steerable wheel pair, adjusting the alignment between each of the toe measuring instruments and one of a pair of symmetrically located points relative to the center point between the steerable wheels while observing said alignment to be substantially the same on each side of the vehicle, fixing the adjustments in place, moving and mounting the toe measuring instruments to the diagonally opposite steerable wheels of the vehicle, and adjusting the steering direction of the steerable wheel pair so that the alignment between each of the toe measuring instruments and one of another pair of symmetrically located points relative to the center point between the non-steerable wheels is substantially the same on each side of the vehicle.

2. The method of claim 1 wherein the alignment system includes lateral reference position targets fixed laterally relative to the wheels when mounted thereon, and wherein the toe measuring instruments include angularly adjustable optics having an optical path extending generally toward a lateral reference target on the same side of the vehicle, and wherein the steps of adjusting the alignment and fixing the adjustments comprises the steps of angularly adjusting the direction of each optical path so that each path intercepts one of a pair of points equidistant from the center point between the steerable wheels, and locking the optics in those angular positions.

3. The method of claim 1 wherein the alignment system includes lateral reference position targets which are fixed laterally relative to the wheels on which mounted, wherein the toe measuring instruments are movable laterally relative to the wheels when mounted thereon, together with the step of mounting one target on each steerable wheel, and wherein the steps of adjusting the alignment and fixing the adjustments comprise the steps of moving the toe measuring instruments laterally until each instrument is aligned with a point on the target on the same side of the vehicle where the points are equidistant from the center point between the steerable wheels, and locking the instruments in those lateral positions.

4. The method of claim 1 wherein the toe measuring instruments are movable laterally relative to the wheels when mounted thereon, and wherein the steps of adjusting the alignment and fixing the adjustments comprises the steps of moving the toe measuring instruments laterally until aligned with a respective one of the pair of symmetrically located points and locking the toe measuring instruments in those lateral positions.

5. The method of claim 1 wherein the toe measuring instruments include angularly adjustable optics having an optical path extending generally toward the symmetrically located points, and wherein the steps of adjusting the alignment and fixing the adjustments comprises the steps of angularly adjusting the direction of each optical path so that the paths intercept the symmetrically located points, and locking the angular adjustments in the optics.

6. A method for use with an alignment system including toe measurement instruments and lateral reference position targets mounted on a vehicle having steerable and non-steerable vehicle wheel pairs for setting the toe of the steerable wheel pair relative to the average rolling direction of the non-steerable wheel pair,
comprising the steps of mounting the toe measuring instruments on the non-steerable wheel pair,
mounting the lateral reference position targets on the steerable wheel pair,
adjusting the alignment between the toe measuring instrument and the lateral reference position target to be substantially the same on each side of the vehicle,
fixing the adjustments in place,
moving and mounting the toe measuring instruments and the lateral reference position targets to the diagonally opposite wheels of the vehicle,
and adjusting the steering linkage of the steerable wheel pair so that the alignment between the lateral reference position target and the toe measuring instrument on each side of the vehicle is substantially the same when the vehicle steering control is centered.

7. The method of claim 6 wherein the lateral reference position targets are movable laterally relative to the wheels when mounted thereon, and wherein the step of adjusting the alignment comprises the step of moving the targets laterally until the targets are positioned at substantially the same lateral position relative to the toe measuring instrument on the same side of the vehicle.

8. The method of claim 6 wherein the lateral reference position targets are fixed laterally relative to the wheels when mounted thereon, wherein the toe measuring instruments include an angularly adjustable optical sight directed generally toward the lateral reference position targets, and wherein the step of adjusting the alignment comprises the step of angularly adjusting each optical sight to view substantially the same lateral position on the target on each side of the vehicle.

9. The method of claim 6 wherein the lateral reference position targets are fixed laterally relative to the wheels when mounted thereon, wherein the toe measuring instruments include an angularly adjustable beam projector emitting a beam directed generally toward the lateral reference position targets, and wherein the step of adjusting the alignment comprises the step of angularly adjusting the direction of each projected beam so that the beams impinge at substantially the same lateral position on the target on each side of the vehicle.

10. A method for use with an alignment system including toe measurement instruments and lateral reference position targets mounted on a vehicle having steerable and non-steerable wheel pairs,
comprising the steps of mounting the toe measuring instruments on the non-steerable wheel pair,
mounting the lateral reference position targets on the steerable wheel pair,
adjusting the alignment between the toe measuring instrument and the lateral reference position target to be substantially the same on each side of the vehicle,
fixing the adjustments in place,
moving and mounting the toe measuring instruments and the lateral reference position targets to the diagonally opposite wheels of the vehicle,
and adjusting the steering linkage of the steerable wheel pair so that the alignment between the lateral reference position target and the toe measuring instrument on each side of the vehicle is substantially the same when the desired total toe is indicated for the steerable wheels by the alignment system.

11. The method of claim 10 wherein the lateral reference position targets are movable laterally relative to the wheels when mounted thereon, and wherein the step of adjusting the alignment comprises the step of moving the targets laterally until the targets are positioned at substantially the same lateral position relative to the toe measuring instrument on the same side of the vehicle.

12. The method of claim 10 wherein the lateral reference position targets are fixed laterally relative to the wheels on which they are mounted, wherein the toe measuring instruments include an angularly adjustable optical sight directed generally toward the lateral reference position targets, and wherein the step of adjusting the alignment comprises the step of angularly adjusting each optical sight to view substantially the same lateral position on the target on each side of the vehicle.

13. The method of claim 10 wherein the lateral reference position targets are fixed laterally relative to the wheels when mounted thereon, wherein the toe measuring instruments include an angularly adjustable beam projector emitting a beam directed generally toward the lateral reference position targets, and wherein the step of adjusting the alignment comprises the step of angularly adjusting the direction of each projected beam so that the beams impinge at substantially the same lateral position on the target on each side of the vehicle.

14. A method utilizing wheel mounted alignment heads providing toe readings for front and rear wheel pairs on a vehicle and having alignment optics therein and wheel mounted graduated scales in optical communication therewith on each side of the vehicle, comprising the steps of
mounting the alignment heads on the rear wheels and the graduated scales on the steerable front wheels,
adjusting the orientation between the alignment optics and the graduated scales on each side of the vehicle to indicate like positions on the scales, transferring the alignment heads and the graduated scales to diagonally opposite wheels while maintaining the adjustments, and turning the steerable front wheels in steering direction until the orientation between the graduated scales and the alignment optics again indicates like positions on the scales, whereby the total front wheel toe is split about the average rear wheel rolling direction.

15. The method of claim 14 wherein the wheel mounted graduated scales are movable laterally relative to the wheels when mounted thereon and wherein the step of adjusting the orientation comprises the step of moving the scales laterally until they are positioned at substantially the same lateral position relative to the alignment optics on the same side of the vehicle.

16. The method of claim 14 wherein the wheel mounted graduated scales are fixed laterally relative to the wheels when mounted thereon, wherein the alignment optics include an angularly adjustable optical sight directed generally toward the graduated scales, and wherein the step of adjusting the orientation comprises the step of angularly adjusting each optical sight to view substantially the same lateral position on the graduated scales on each side of the vehicle.

17. The method of claim 14 wherein the wheel mounted graduated scales are fixed laterally relative to the wheels when mounted thereon, wherein the alignment optics include an angularly adjustable beam projector emitting a beam directed generally toward the graduated scales, and wherein the step of adjusting the orientation comprises the step of angularly adjusting the direction of each beam so that the beams impinge at substantially the same lateral position on the scale on each side of the vehicle.

18. A method utilizing wheel mounted alignment heads providing toe measurements for steerable and non-steerable wheel pairs on a vehicle and having alignment optics therein, comprising the steps of mounting the alignment heads on the non-steerable wheel pair, adjusting the alignment optics to have substantially the same relationship to symmetrically located points on each side of the center point between the steerable wheel pair while observing said alignment to be substantially the same on each side of the vehicle, transferring the alignment heads from the non-steerable wheels to the diagonally opposite steerable wheels while maintaining the optics adjustments, and adjusting the steering direction of the steerable wheels until the alignment optics have substantially another same relationship to symmetrically located points on each side of the center point between the non-steerable wheel pair, whereby the total steerable wheel pair toe is equally divided in relation to the straight ahead direction of the non-steerable wheel pair.

19. The method of claim 18 wherein the alignment optics include adjustable optical sights directed generally toward the nearest wheel of the other wheel pair and wherein the step of adjusting the alignment optics comprises the step of adjusting each optical sight to view similar but symmetrically opposed areas related to each wheel of the other wheel pair.

20. The method of claim 18 wherein the alignment optics include adjustable beam projectors emitting beams directed generally toward the nearest wheel of the other wheel pair and wherein the step of adjusting the alignment optics comprises the step of adjusting each beam to impinge upon similar but symmetrically opposed areas related to each wheel of the other wheel pair.

* * * * *